US012508609B2

United States Patent
Fujii et al.

(10) Patent No.: US 12,508,609 B2
(45) Date of Patent: Dec. 30, 2025

(54) SPRAY IONIZATION DEVICE, ANALYSIS DEVICE, AND SURFACE COATING DEVICE

(71) Applicant: National Institute of Advanced Industrial Science and Technology, Tokyo (JP)

(72) Inventors: Shinichiro Fujii, Tsukuba (JP); Kazumi Inagaki, Tsukuba (JP); Shinichi Miyashita, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 368 days.

(21) Appl. No.: 17/794,374

(22) PCT Filed: Jan. 19, 2021

(86) PCT No.: PCT/JP2021/001635
§ 371 (c)(1),
(2) Date: Jul. 21, 2022

(87) PCT Pub. No.: WO2021/181892
PCT Pub. Date: Sep. 16, 2021

(65) Prior Publication Data
US 2023/0051469 A1 Feb. 16, 2023

(30) Foreign Application Priority Data
Mar. 11, 2020 (JP) .................. 2020-041905

(51) Int. Cl.
*B05B 5/03* (2006.01)
*B05B 5/00* (2006.01)
(Continued)

(52) U.S. Cl.
CPC ............... *B05B 5/03* (2013.01); *B05B 5/001* (2013.01); *B05B 5/0255* (2013.01); *B05B 7/066* (2013.01);
(Continued)

(58) Field of Classification Search
CPC ......... B05B 5/03; B05B 5/001; B05B 5/0255; B05B 7/066; B05B 7/1626; B05B 7/1686;
(Continued)

(56) References Cited

U.S. PATENT DOCUMENTS 4,018,973 A * 4/1977 Paton ...................... F27D 11/08
373/21
4,575,609 A * 3/1986 Fassel ..................... B23K 10/00
239/424.5
(Continued)

FOREIGN PATENT DOCUMENTS

EP 1598849 A2 11/2005

*Primary Examiner* — Joseph A Greenlund
(74) *Attorney, Agent, or Firm* — Troutman Pepper Locke LLP; James E. Armstrong, IV; Nicholas J. DiCeglie, Jr.

(57) ABSTRACT

A spray ionization device comprising: a first pipe body that has a first flow path which allows a liquid to flow therethrough, and has, at one end thereof, a first outlet through which the liquid is sprayed out; a second pipe body that surrounds the first pipe body; and a third pipe body that surrounds the second pipe body with a space interposed therebetween, that has a second flow path allowing a gas to flow therethrough, and that has a second outlet at the one end. At least the leading end part of the third pipe body including the second outlet is made of an electrically conductive material so as to serve as an electrode. Charged droplets can be sprayed from the second outlet by applying an electric field to droplets sprayed from the first outlet using a power supply connected to the electrode.

9 Claims, 8 Drawing Sheets

(51) Int. Cl.
- *B05B 5/025* (2006.01)
- *B05B 7/06* (2006.01)
- *B05B 7/08* (2006.01)
- *B05B 7/16* (2006.01)
- *B05B 7/24* (2006.01)

(52) U.S. Cl.
CPC .......... *B05B 7/1626* (2013.01); *B05B 7/1686* (2013.01); *B05B 7/2491* (2013.01)

(58) Field of Classification Search
CPC ..... B05B 7/2491; H01J 49/045; H01J 49/167; H01J 49/165
See application file for complete search history.

(56) References Cited

U.S. PATENT DOCUMENTS

| | | | | |
|---|---|---|---|---|
| 4,775,774 A * | 10/1988 | Caneer, Jr. | ........... | H05H 1/3405 219/121.54 |
| 6,511,850 B1 * | 1/2003 | Vigh | ................ | G01N 27/44717 261/78.2 |
| 6,586,731 B1 * | 7/2003 | Jolliffe | ................ | H01J 49/049 250/281 |
| 7,145,137 B2 * | 12/2006 | Montaser | .............. | H01J 49/105 250/288 |
| 7,671,329 B2 * | 3/2010 | Sakata | ................ | H01J 49/105 250/281 |
| 7,960,711 B1 * | 6/2011 | Sheehan | ............... | H01J 49/165 250/493.1 |
| 8,272,576 B2 * | 9/2012 | Doak | ................ | B05B 7/0475 239/128 |
| 8,772,709 B2 * | 7/2014 | Moeller | ................ | H01J 49/167 250/281 |
| 8,809,777 B2 * | 8/2014 | Bajic | ................ | G01N 30/724 250/288 |
| 9,165,751 B1 * | 10/2015 | Schleifer | ................ | G01N 1/28 |
| 9,299,553 B2 * | 3/2016 | Whitehouse | ........... | H01J 49/26 |
| 9,520,278 B2 * | 12/2016 | Inagaki | ................ | H01J 49/045 |
| 9,768,004 B2 * | 9/2017 | Fogwill | ................ | H01J 49/10 |
| 11,705,318 B2 * | 7/2023 | Bajic | ................ | H01J 49/167 250/282 |
| 11,826,770 B2 * | 11/2023 | Inagaki | ................ | G01N 21/714 |
| 11,944,993 B1 * | 4/2024 | Burgener | ............ | B05B 7/0815 |
| 2009/0250608 A1 * | 10/2009 | Mordehai | ............ | H01J 49/167 250/288 |
| 2014/0014747 A1 | 1/2014 | Moeller et al. | | |
| 2014/0353495 A1 * | 12/2014 | Inagaki | ................ | H01J 49/105 239/398 |
| 2015/0206729 A1 * | 7/2015 | Inagaki | ................ | H01J 49/045 250/288 |
| 2017/0025262 A1 * | 1/2017 | Xu | ........ | G01N 27/447 |
| 2019/0341241 A1 | 11/2019 | Kaushal et al. | | |
| 2020/0234940 A1 * | 7/2020 | Fukui | ................ | H01J 49/165 |
| 2021/0210320 A1 * | 7/2021 | Bajic | ................ | H01J 49/045 |
| 2022/0001405 A1 * | 1/2022 | Inagaki | ................ | B05B 5/03 |
| 2022/0305505 A1 * | 9/2022 | Fujii | ................ | B05B 7/066 |
| 2023/0051469 A1 * | 2/2023 | Fujii | ................ | B05B 5/001 |
| 2023/0063626 A1 * | 3/2023 | Fujii | ................ | B05B 7/066 |

* cited by examiner

SPRAY IONIZATION DEVICE, ANALYSIS DEVICE, AND SURFACE COATING DEVICE

BACKGROUND OF THE INVENTION

Technical Field

The present invention relates to a spray ionization device.

Background Art

A mass spectrometer can count ions constituting a substance by each mass-to-charge ratio to obtain ionic strength which is quantitative information on the substance. The mass spectrometer can perform more accurate analysis by obtaining ionic strength having a favorable signal-to-noise ratio. Therefore, an analysis target, which is an ionized or charged material, needs to be sufficiently introduced.

Examples of a method of ionizing a liquid sample include an electrospray ionization method. With the electrospray ionization method, high voltage of several kilovolts is applied to a sample solution in a narrow tube, a liquid cone (so-called Taylor cone) is formed at the tip of an outlet port, electrically charged droplets are ejected from the tip, solvents evaporate to reduce the volume of the electrically charged droplets, and the droplets finally split apart to generate gas-phase ions. This method can form electrically charged droplets at a rate of ejecting 1 to 10 μL/min of solution, in which the ejection rate is not sufficient for use in conjunction with a liquid chromatography method.

A gas spray assisted electrospray ionization method (see, for example, U.S. Pat. No. 8,809,777) may be an example of a method for supporting generation of electrically charged droplets and vaporization of solvents by ejecting a gas from an outer tube surrounding a narrow tube of a sample solution, in order to promote vaporization of electrically charged droplets.

Patent Document 1: U.S. Pat. No. 8,809,777, Specification

SUMMARY OF THE INVENTION

Problems to be Solved by the Invention

However, the gas spray assisted electrospray ionization method as disclosed in U.S. Pat. No. 8,809,777 generates electrically charged droplets having a large particle size; therefore, there is a need to use techniques such as promoting vaporization of solvents by using a heated gas, atomizing electrically charged droplets by collision with a plate-shaped target, or making the ejection direction orthogonal to the direction of introducing the atomized and electrically charged droplets in order to remove excessively large electrically charged droplets; as a result, electrically charged droplets cannot be efficiently obtained, which has been a problem.

One object of the present invention is to solve the aforementioned problems and provide a spray ionization device which can obtain atomized and electrically charged droplets, and is capable of efficiently ionizing molecules, clusters, etc. contained in liquid.

Means for Solving the Problems

One aspect of the present invention provides a spray ionization device including:

a first tube including a first channel through which a liquid can flow, the first tube including a first outlet for ejecting the liquid at one end; a second tube surrounding the first tube; and a third tube surrounding the second tube with a gap, and having a second channel through which gas can flow, the third tube having a second outlet at the one end, in which the second channel is defined by an outer circumferential surface of the second tube and an inner circumferential surface of the third tube, in which the second outlet of the third tube is disposed at the same position in an axial direction as the first outlet or more downstream than the first outlet, an opening diameter of the second outlet is formed to be smaller than a diameter of the outer circumferential surface of the second tube, and the third tube has at least a tip including a second outlet consisting of an electrically conductive material as an electrode, and capable of applying an electric field to droplets ejected from the first outlet by a power source connected to the electrode to eject electrically charged droplets from the second outlet.

The second outlet of the third tube having the second channel through which gas can flow is arranged at the same position in the axial direction as the first outlet of the first tube having the first channel through which liquid can flow, or more downstream than this, and the opening diameter of the above-mentioned second outlet is formed to be smaller than the diameter of the outer circumferential surface of the above-mentioned second tube; therefore, in the region between the first outlet and the second outlet, the liquid ejected from the first outlet is atomized by the gas flowing in along the inner circumferential surface of the third tube from upstream thereof, and further, the atomized droplets are electrically charged by the electric field from the tip of the third tube. Since the electrically charged droplets are atomized, desolvation by evaporation is easily conducted, and thus it is possible to provide a spray ionization device capable of efficiently ionizing molecules, clusters, etc. of components contained in the sample liquid Lf.

PREFERRED MODE FOR CARRYING OUT THE INVENTION

Hereinafter, embodiments of the present invention will be described with reference to the drawings. Note that elements that are common between a plurality of drawings are denoted by the same reference characters, and detailed descriptions of such elements will not be repeated.

First Embodiment

Figure 1:
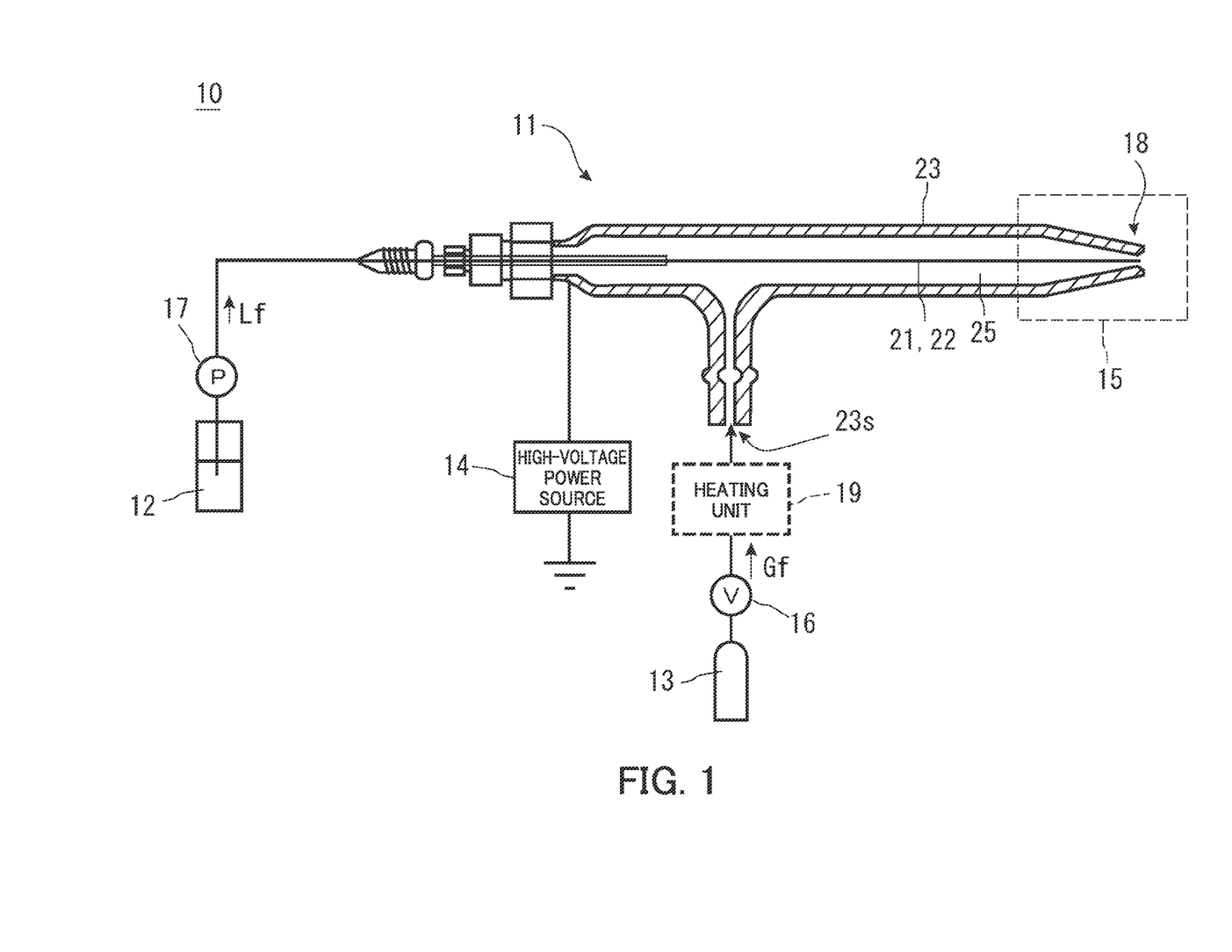
FIG. 1 is a diagram schematically illustrating a configuration of a spray ionization device according to a first embodiment of the present invention.
Figure 2A:
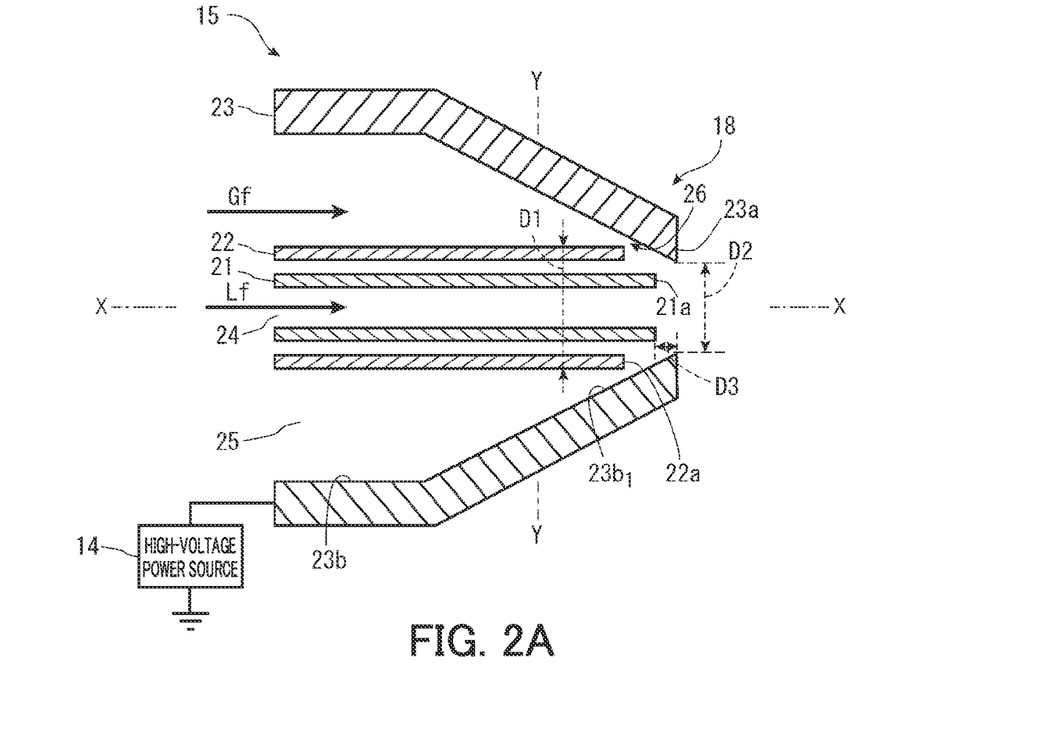
FIGS. 2A and 2B are cross-sectional views of a nozzle of a sprayer according to the first embodiment of the present invention.
Figure 2B:
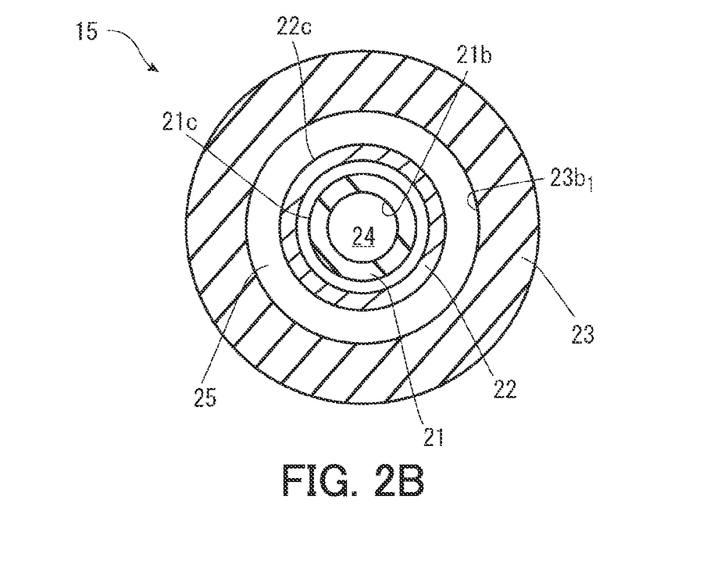

FIG. 1 is a diagram schematically illustrating a configuration of a spray ionization device according to a first embodiment of the present invention. FIGS. 2A and 2B are cross-sectional views of a nozzle of a sprayer, in which FIG. 2A is an enlarged cross-sectional view of the nozzle in FIG. 1, and FIG. 2B is a cross-sectional view along arrows Y-Y in FIG. 2A.

Referring to FIGS. 1, 2A and 2B, a spray ionization device 10 according to a first embodiment of the present invention includes: a sprayer 11; a container 12 containing a sample liquid Lf to be supplied to the sprayer 11; a cylinder 13 for containing a spraying gas Gf to be supplied to the sprayer 11; and a high-voltage power source 14 for applying a high electric field to droplets of the ejected sample liquid Lf. In the spray ionization device 10, a nozzle 15 for ejecting electrically charged droplets is formed at one end (hereinafter also referred to as an ejection end) of the sprayer 11. The sample liquid Lf and the spraying gas Gf are supplied from further toward the opposite end than the nozzle 15 (hereinafter also referred to as a supply end). The sample liquid Lf may be continuously or intermittently supplied from the container 12 by way of a pump 17 or the like. The sample liquid Lf may contain an analysis target in solvents, or may contain dissolved components, particulate matter, or the like, for example. The spraying gas Gf is supplied from the compressed gas cylinder 13 through the valve 16 to the supply port 23s. Inert gas such as nitrogen gas or argon gas, or air can be used for the spraying gas Gf, for example. A heating unit 19 such as a heater or dryer for heating the spraying gas Gf may be provided between the compressed gas cylinder 13 or the valve 16 and the supply port 23s. The spraying gas Gf is heated, whereby vaporization of solvents in the ejected sample liquid Lf can be promoted, and electrically charged droplets can be obtained more efficiently.

The sprayer 11 includes a liquid supply tube 21, a protective tube 22 surrounding the liquid supply tube 21, and a gas supply tube 23 that surrounds the protective tube 22 with a gap. The liquid supply tube 21, protective tube 22 and the gas supply tube 23 have a triple tube structure, in which the tubes are preferably coaxial (central axis X-X) with one another.

The liquid supply tube 21 extends from the supply end to the ejection end. The liquid supply tube 21 includes a first channel 24 being tubular and defined by an inner circumferential surface 21b of the liquid supply tube 21, and includes an outlet 21a of the nozzle 15 at the ejection end. In the liquid supply tube 21, the sample liquid Lf is supplied from the supply side, passes through the first channel 24 and is ejected from the outlet 21a.

A diameter (inner diameter) of the inner circumferential surface 21b of the liquid supply tube 21 is preferably 10 μm to 250 μm, and a diameter (outer diameter) of an outer circumferential surface 21c of the liquid supply tube 21 is preferably 100 μm to 400 μm. In terms of atomizing droplets, an opening diameter of the outlet 21a is preferably 0.2 μm to 150 μm. In terms of atomizing droplets, the thickness (wall thickness) of the liquid supply tube 21 is preferably 1 μm to 50 μm. The liquid supply tube 21 is preferably formed from an electrically conductive material such as stainless steel (for example, SUS316), or a dielectric material made of glass and plastic.

The protective tube 22 surrounds the liquid supply tube 21, and extends from the supply end to the ejection end. A tip 22a on the ejection side is arranged more to the supply side than the outlet 21a of the liquid supply tube 21.

The gas supply tube 23 includes a second channel 25 defined by an inner circumferential surface 23b, $23b_1$ of the gas supply tube 23 and the outer circumferential surface 22c of the protective tube 22, and includes an outlet 23a of the nozzle 15. Although not limited in particular, a diameter (inner diameter) of the inner circumferential surface 23b of the gas supply tube 23 is, for example, 4 mm further toward the supply end than the nozzle 15.

The spraying gas Gf is pressurized and supplied from the supply port 23s of the gas supply tube 23, flows through the second channel 25, and is ejected from the outlet 23a. A flow rate of the spraying gas Gf is appropriately set in accordance with the flow rate of the sample liquid Lf, and is set to 0.5 L/min to 5 L/min, for example.

At the outlet 23a, the gas supply tube 23 functions as an electrode 18 for applying a high electric field to droplets of the sample liquid Lf ejected from the outlet 21a of the liquid supply tube 21. In the gas supply tube 23, at least the tip including the outlet 23a is formed from a conductive material, e.g. metallic material. As the metallic material, it is possible to use stainless steel (e.g., SUS316), aluminum or the like, and it is preferably stainless steel in the point of the heat-insulating property during heating. It should be noted that the entirety of the gas supply tube 23 may be formed by a conductive material such as a metal tube. A high-voltage power source 14 is connected to the electrode 18. The high-voltage power source 14 is a power source for generating high-voltage direct current voltage, and is connected to the electrode 18. The high-voltage power source 14 applies voltage of e.g., 3 kV to the electrode 18, and preferably applies voltage in a range of −5 kV to +5 kV in terms of ionization.

In the nozzle 15, the outlet 23a of the gas supply tube 23 is arranged at the same position in the X-axis direction as the outlet 21a of the liquid supply tube 21, or further downstream therefrom. The gas supply tube 23 is formed such that a portion $23b_1$ of the inner circumferential surface of the gas supply tube 23 has a diameter that progressively decreases from upstream toward downstream, whereby the channel area of the second channel 25 progressively decreases towards downstream. Here, the channel area refers to an area occupied by the second channel 25 on a plane perpendicular to the central axis X, in which the area is surrounded by the inner circumferential surface $23b_1$ of the gas supply tube 23 and the outer circumferential surface 21c of the liquid supply tube 21 as illustrated in FIG. 2B. The distance (D3) in the X-axis direction between the outlet 21a of the liquid supply tube 21 and the outlet 23a of the gas supply tube 23 is preferably set to the range of 0 to 1 mm, in terms of the electrification of droplets.

An opening diameter D2 of the outlet 23a of the gas supply tube 23 is formed so as to become smaller than the diameter D1 of the outer circumferential surface of the protective tube 22. The flow velocity of the spraying gas Gf flowing through the gas supply tube 23 increases, whereby it is possible to promote atomization of droplets of the sample liquid Lf ejected from the outlet 21a of the liquid supply tube 21, and the atomized droplets can be electrically charged by the high electric field applied at the outlet 21a.

The gas supply tube 23 is preferably formed such that the diameter D2 of the inner circumferential surface of the outlet 23a of the gas supply tube 23 is equal to or larger than the opening diameter of the outlet 21a of the surface liquid supply tube 21. With such a configuration, droplets of the sample liquid Lf are ejected from the outlet 21a of the liquid supply tube 21, enveloped in the spraying gas Gf flowing through the second channel 25, and flow downstream (page right side) while focusing along the X-axis in the central direction. As a result, droplets of the sample liquid Lf are suppressed from contacting the inner circumferential surface $22b_1$ of the gas supply tube 23 in the vicinity of the outlet 21a of the liquid supply tube 21, whereby the nozzle 15 can be prevented from clogging. In addition, the flow of the ejected sample liquid Lf focuses by the spraying gas Gf, whereby droplets are atomized.

In the nozzle 15, the constriction portion 26 of the second channel 25 may be formed by the tip 22a of the protective tube 22 and the portion $23b_1$ of the inner circumferential surface of the gas supply tube 23. As a result, the second channel 25 is formed such that the channel area of the second channel 25 progressively decreases from the supply end to the constriction portion 26. The spraying gas Gf passes through the constriction portion 26 to gain the flow velocity, and the flow of droplets of the sample liquid Lf ejected from the outlet 21a of the liquid supply tube 21 further focuses, promoting atomization of droplets. Droplets ejected from the outlet 21a of the liquid supply tube 21 can be further suppressed from flowing backward and entering the constriction portion 26. As a result, clogging of the constriction portion 26 due to precipitation of components such as salts contained in droplets can be suppressed, whereby stable ejection can be achieved. This constriction portion 26 achieves a flow-focusing effect, in which droplets ejected from the outlet 21a can be ejected at a narrower angle (i.e., in a smaller lateral spreading range with respect to the ejection direction) than the case without the constriction portion 26. As a result, efficiency of generating gas phase ions in the ejected and electrically charged droplets can be enhanced.

The outer circumferential face 21c of the liquid supply tube 21, has an outer diameter formed to be constant towards the outlet 21a, whereby the flow of spraying gas Gf converges the ejected sample liquid Lf at the outlet 21a of the liquid supply tube 21, and it is possible to suppress splashing of the sample liquid Lf and effectively form droplets. It should be noted that the end face of the outlet 21a may be formed so as to progressively decrease in diameter from the upstream side towards the outlet 21a.

According to the first embodiment, the outlet 23a of the gas supply tube 23 is arranged at the same position in the X-axis direction as the outlet 21a of the liquid supply tube 21 or more downstream thereto, and the opening diameter D2 of the outlet 23a of the gas supply tube 23 is formed to be smaller than the diameter D1 of the outer circumferential surface of the protective tube 22; therefore, in a region between the outlet 21a of the liquid supply tube 21 and the outlet 23a of the gas supply tube 23, the sample liquid Lf ejected from the outlet 21a of the liquid supply tube 21 is atomized by the spraying gas Gf flowing in from the upstream along the inner circumferential surface $23b_1$ of the gas supply tube 23, and further, the atomized droplets electrically charge by the electric field from the tip of the gas supply tube 23. Since the electrically charged droplets are atomized, desolvation by evaporation is easily conducted, and thus it is possible to provide a spray ionization device capable of efficiently ionizing molecules, clusters, etc. of components contained in the sample liquid Lf.

Figure 3A:
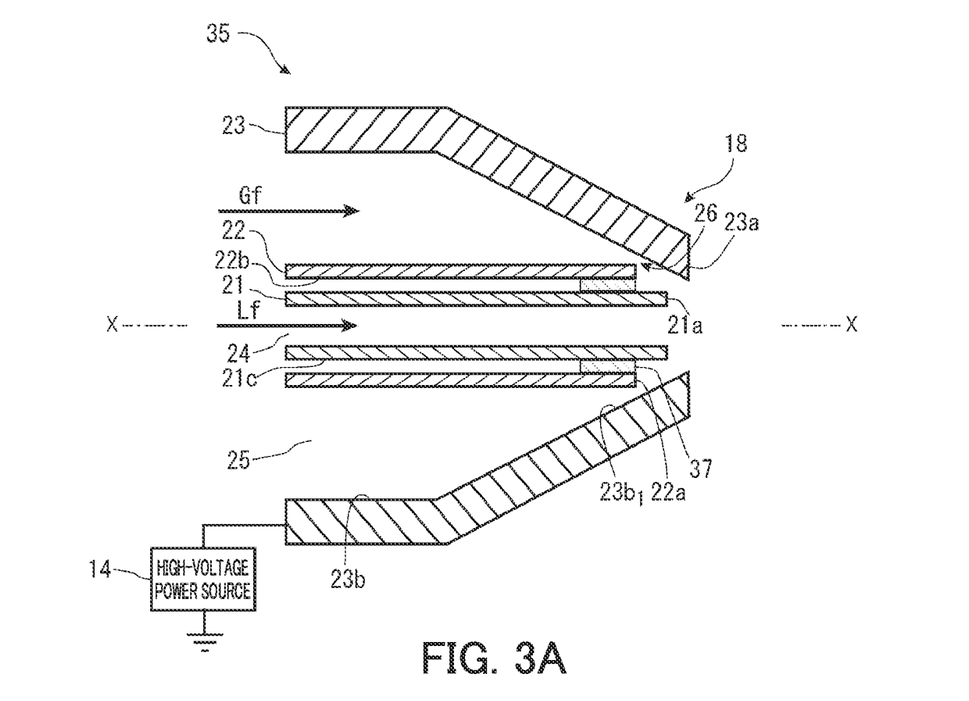
FIGS. 3A and 3B are cross-sectional views illustrating a variation of the nozzle of the sprayer of the first embodiment of the present invention.

FIGS. 3A and 3B are cross-sectional views illustrating a variation of the nozzle of the sprayer of the first embodiment according to the present invention. Referring to FIG. 3A, the nozzle 35 of the first variation includes a blocking member 37 along a circumferential direction in a gap between the outer circumferential surface 21c of the liquid supply tube 21 and the inner circumferential surface 22b of the protective tube 22, at the tip 22a toward the ejection end of the protective tube 22. The blocking member 37 blocks this gap. Except that the closing member 37 is provided, the nozzle 35 has the same configuration as the nozzle 15 of the sprayer illustrated in FIGS. 2A and 2B. With this configuration, the blocking member 37 prevents the spraying gas Gf having passed through the gas between the tip 22a of the protective tube 22 and the inner circumferential surface $23b_1$ of the gas supply tube 23 (or constriction portion 26) from entering the gap between the outer circumferential surface 21c of the liquid supply tube 21 and the inner circumferential surface 22b of the protective tube 22. As a result, turbulence of the spraying gas Gf by entering to the gap is suppressed from occurring, the flow of droplets of the sample liquid Lf focuses, and atomization and electrical charging of droplets are promoted.

Figure 3B:
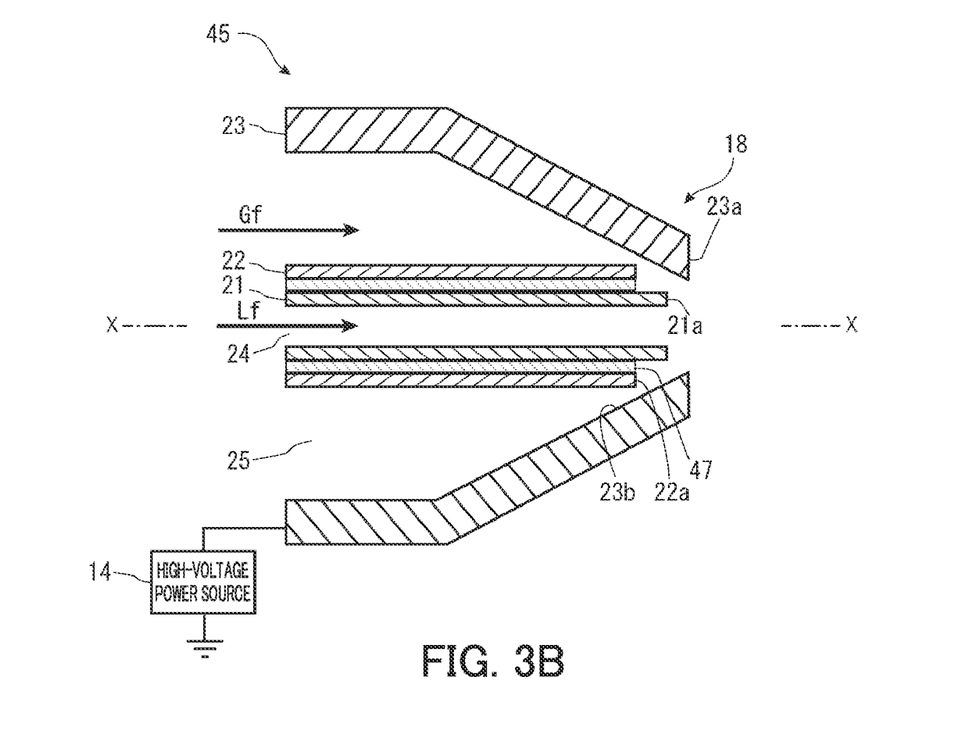

Referring to FIG. 3B, in the nozzle 45 of the second variation, a blocking member 47 is provided entirely along the circumferential direction and X-axis direction (longitudinal direction) of the gap between the outer circumferential surface 21a of the liquid supply tube 21 and the inner circumferential surface 22b of the protective tube 22. In other words, the blocking member 47 is formed so that the protective tube 22 makes contact along the circumferential direction and longitudinal direction with the liquid supply tube 21. It is thereby possible to fix the liquid supply tube 21, and suppress the occurrence of turbulence from entry of spraying gas Gf to the gap. It should be noted that, by appropriately selecting the inside diameter of the protective tube 22 or outside diameter of the liquid supply tube 21, it may be formed so that the inner circumferential surface 22b of the protective tube 22 directly contacts the outer circumferential surface 21c of the liquid supply tube 21.

Second Embodiment

Figure 4:
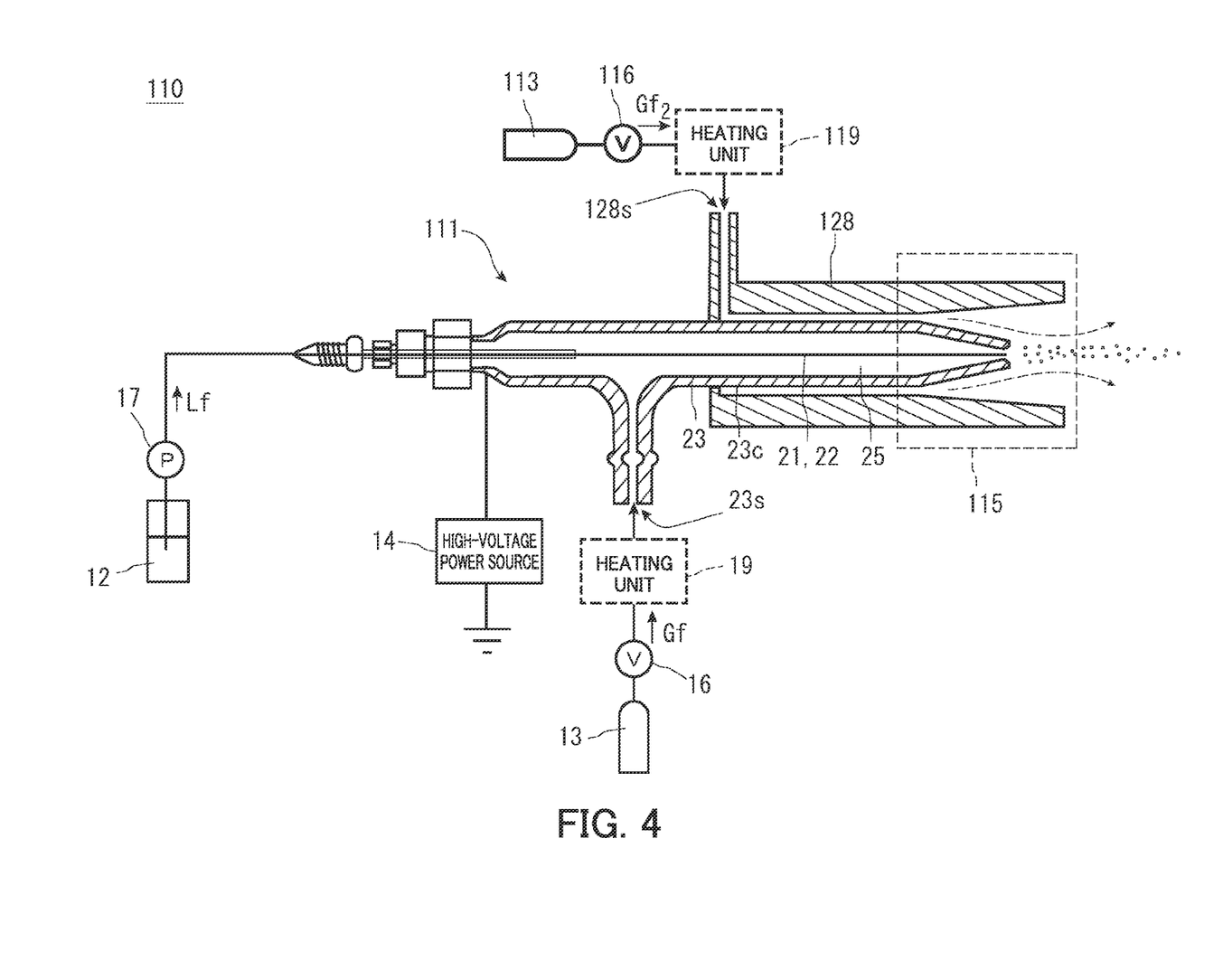
FIG. 4 is a diagram schematically illustrating a configuration of a spray ionization device according to a second embodiment of the present invention.
Figure 5:
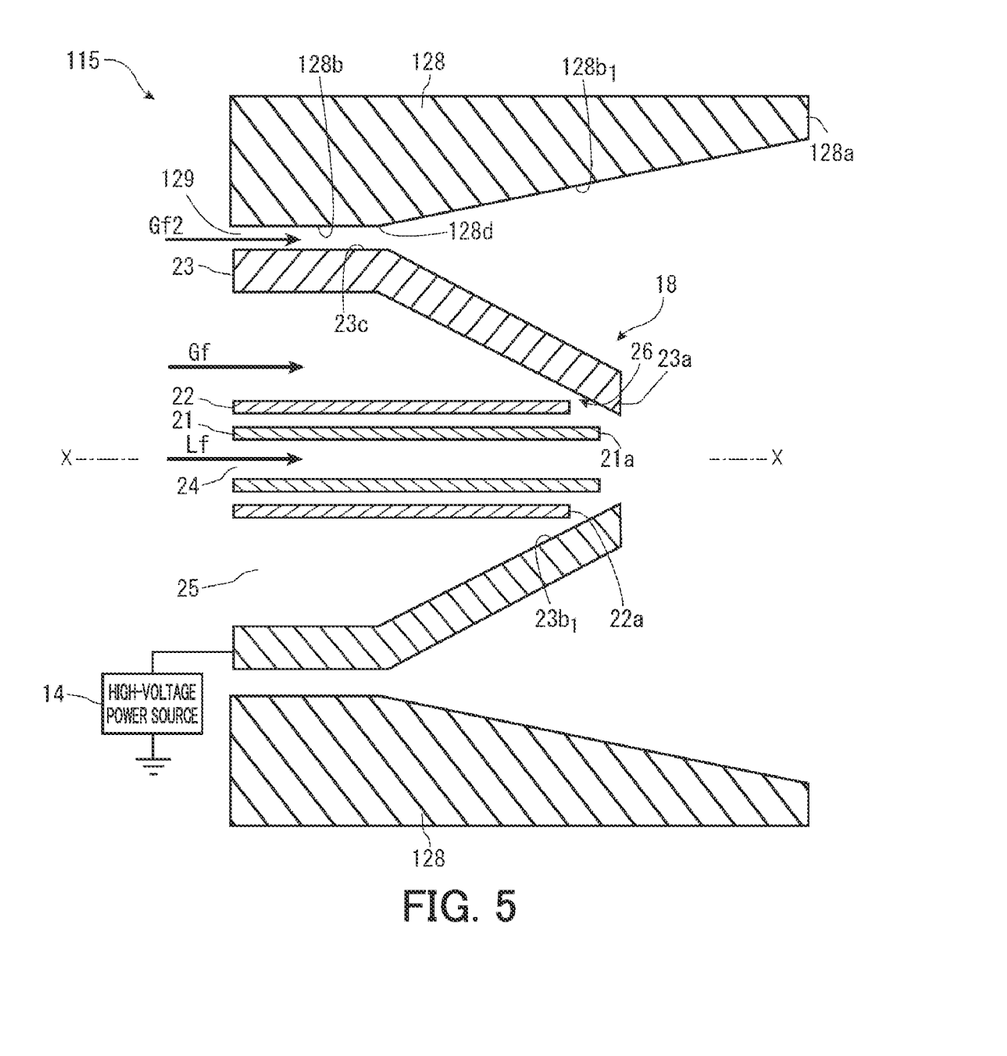
FIG. 5 is a cross-sectional view of a nozzle of a sprayer of the spray ionization device according to the second embodiment of the present invention.

FIG. 4 is a diagram schematically illustrating a configuration of a spray ionization device according to a second embodiment of the present invention, and FIG. 5 is a cross-sectional view of a nozzle of a sprayer of this spray ionization device. Referring to FIGS. 4 and 5, the spray ionization device 110 has a sprayer 111 with a quadruple-tube structure having a liquid supply tube 21, a protective tube 22 surrounding the liquid supply tube 21, a gas supply tube 23 surrounding the protective tube 22 with a gap, and a second gas supply tube 128 surrounding the gas supply tube 23. The structures of the liquid supply tube 21, protective tube 22 and gas supply tube 23 are similar to the sprayer 11 of the first embodiment.

In the sprayer 111, the sheath gas $Gf_2$ is supplied to the supply opening 128s via the valve 116 from a compressed gas cylinder 113 in the second gas supply tube 128. The second gas supply tube 128 has a third channel 129 defined by an outer circumferential surface 23c of the gas supply tube 23 and an inner circumferential surface 128b of the second gas supply tube 128, and extending in the X-axis direction. The inner circumferential surface 128b of the second gas supply tube 128 is formed so as to have a constant diameter from the supply side toward downstream until the position 128d. The position 128d is a position opposing the position at which the outer circumferential surface 23c of the gas supply tube 23 starts to decrease in diameter towards the outlet 23a. Furthermore, in the second gas supply tube 128, the inner circumferential surface $128b_1$ progressively expands in diameter from the position 128d towards the outlet 128a. The sheath gas $Gf_2$ thereby flows through the third channel 129, ejects at the position 128d, flows in the direction of the outlet 23a along the outer circumferential surface 23c of the gas supply tube 23, and flows so as to focus the electrically charged and atomized droplets ejected from the outlet 21a of the liquid supply tube 21a. Further downstream therefrom, since the inner circumferential surface $128b_1$ of the second gas supply tube 128 progressively expands in diameter, the sheath gas $Gf_2$ flows so as to spread in the lateral direction to downstream. It is thereby possible to focus the flow of electrically charged and atomized droplets, and promote desolvation.

A heating unit 119 may be provided downstream of the valve 116 so as to supply the sheath gas $Gf_2$ as heated gas; or a heating unit such as a ring heater (not illustrated) may be provided downstream of the outlet 23a of the gas supply tube 23 so as to surround a second gas supply tube 128. As a result, desolvation of ejected droplets can be supported.

It should be noted that, in the second gas supply tube 128, the inner circumferential surface $128b_1$ may have a constant diameter from the position 128d toward the outlet 128a.

As a variation of the spray ionization device according to the second embodiment, the portion of the nozzle 115 consisting of the liquid supply tube 21, protective tube 22 and gas supply tube 23 may be replaced with the nozzle 35 shown in FIG. 3A, or the nozzle 45 shown in FIG. 3B.

According to the second embodiment, the sheath gas $Gf_2$ passing through the third channel 129 of the second gas supply tube 128 flows so as to focus the electrically charged and atomized droplets ejected from the outlet 21a of the liquid supply tube 21, and further downstream therefrom, since the inner circumferential surface $128b_1$ of the second gas supply tube 128 progressively expands in diameter, the sheath gas $Gf_2$ flows so as to spread in the lateral direction to downstream. It is thereby possible to focus the flow of electrically charged and atomized droplets, and promote desolvation.

Hereinafter, measurement examples prepared using examples of the spray ionization devices according to embodiments of the present invention will be shown. Example 1 used a configuration having the sprayer 11 in the spray ionization device 10 of the first embodiment shown in FIGS. 1, 2A and 2B. The gas supply tube 23 was formed from SUS316, the high-voltage power source of a mass spectrometer main body was connected to the gas supply tube 23, and the gas supply tube 23 was used as the electrode. The inside diameter of the liquid supply tube 21 is 110 μm, and the opening diameter (D2) of the gas supply tube 23 is 200 μm. The outside diameter (D1) of the protective tube 22 is 1600 μm. The distance (D3) between the outlet 21a of the liquid supply tube 21 and the outlet 23a of the gas supply tube 23 was set as 0 mm.

Example 2 used a configuration having the sprayer 111 in the spray ionization device 110 of the second embodiment shown in FIGS. 4 and 5.

The spray ionization device of Comparative Example 1 was an ESI ion source applying the gas spray assist electrospray ionization (ESI) method, and used a sprayer (ESI probe (ion source)) belonging to a mass spectrometer model LCMS-2020 manufactured by Shimadzu Corp. The spray ionization device of Comparative Example 2 was an ESI ion source adopting the same ESI method, and used a sprayer belonging to a mass spectrometer model LCMS-8060 manufactured by Shimadzu Corp.

Figure 6:
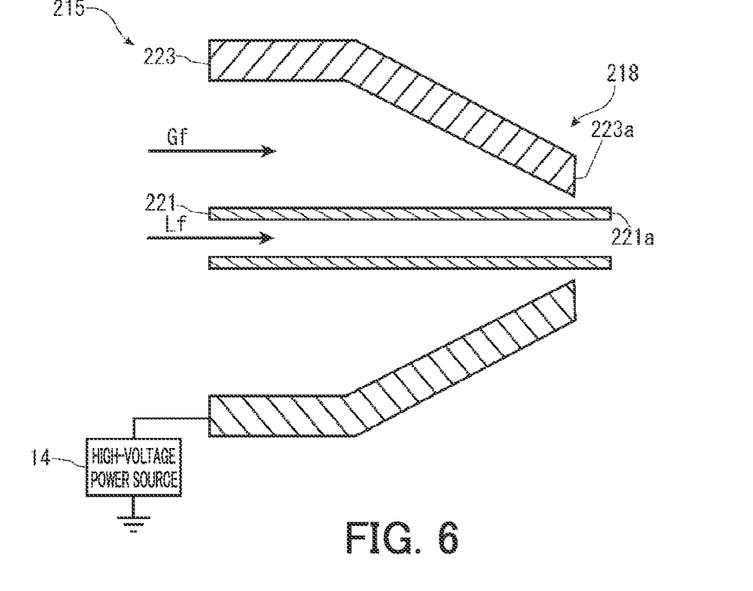
FIG. 6 is a schematic cross-sectional view of a nozzle of a sprayer according to Comparative Example 1.

FIG. 6 is a schematic cross-sectional view of the nozzle of the sprayer according to Comparative Example 1. Referring to FIG. 6, the nozzle 215 of the sprayer of Comparative Example 1 has a double-tube structure, and has the liquid supply tube 221 through which the sample liquid Lf flows, and the gas supply tube 223 surrounding the liquid supply tube 221 and through which the spraying gas Gf flows. The outlet 221a of the liquid supply tube 221 is provided further downstream from the outlet 223a of the gas supply tube 223. The liquid supply tube 221 and gas supply tube 223 are formed from a metallic material (SUS316). Using the gas supply tube 223 as the electrode 218, the high-voltage power source 14 was connected thereto, and a high electric field was applied from the outlet 223a of the gas supply tube 223 to electrically charge droplets of the sample liquid Lf ejected from the outlet 221a of the gas supply tube 221.

Figure 7:
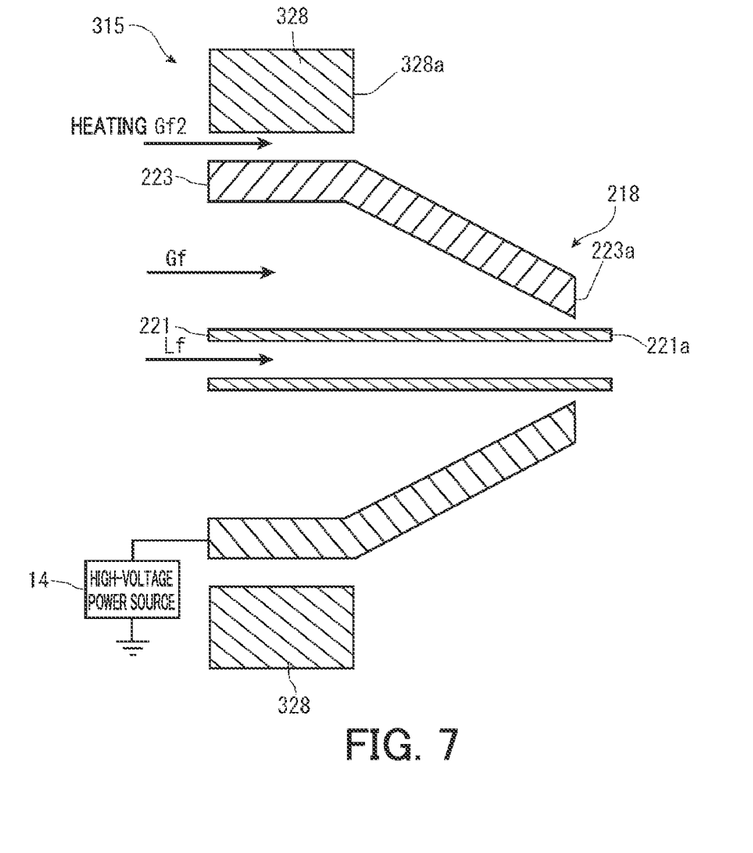
FIG. 7 is a schematic cross-sectional view of a nozzle of a sprayer according to Comparative Example 2.

FIG. 7 is a schematic cross-sectional view of the nozzle of the sprayer according to Comparative Example 2. Referring to FIG. 7, the nozzle 315 of the sprayer of Comparative Example 2 has a triple-tube structure, and includes the liquid supply tube 221 through which the sample liquid Lf flows, the gas supply tube 223 surrounding the liquid supply tube 221 and through which the spraying gas Gf flows, and the second gas supply tube 328 surrounding the gas supply tube 223 and through which heated sheath gas $Gf_2$ flows. The liquid supply tube 221 and gas supply tube 223 are formed similarly to Comparative Example 1. The second gas supply tube 228 is formed from a metallic material (SUS316). Using the gas supply tube 223 as the electrode, the high-voltage power source 14 was connected to this, and a high electric field was applied from the outlet 223a of the gas supply tube 223 to electrically charge droplets of the sample liquid Lf ejected from the outlet 221a of the gas supply tube 221. The tip 328a of the second gas supply tube 328 is arranged close to the position at which the outer circumferential surface 23c of the gas supply tube 23 starts to decrease in diameter towards the outlet 23a.

The spray ionization device of Example 1 was applied to the LC (liquid chromatography)/MS (mass spectrometry)/MS device, a model LC-10 series manufactured by Shimadzu Corp. was used as the LC device, and the model LCMS-2020 manufactured by Shimadzu Corp. was used as the MS device. The spraying gas Gf employed nitrogen gas at room temperature, and was supplied to the nozzle without heating.

The spray ionization device of Example 2 was applied to the LC device and MS/MS device, a model LC-30 series manufactured by Shimadzu Corp. was used as the LC device, and the model LCMS-8060 manufactured by Shimadzu Corp. was used as the MS/MS device. The spraying gas Gf employed nitrogen gas at room temperature, the sheath gas $Gf_2$ employed nitrogen gas, and was supplied to the nozzle with heating.

In Examples 1 and 2, for the interface between the LC device and MS device, it ejects towards the ion capture port of the MS device, and heating of the sprayed droplets was performed by heating the sheath gas.

The spray ionization device of Comparative Example 1 was adopted to the LC device/MS device, a model LC-10 series manufactured by Shimadzu Corp. was used as the LC device, and the model LCMS-2020 manufactured by Shimadzu Corp. was used as the MS device/MS device. The spraying gas Gf used nitrogen gas at room temperature, and was supplied to the nozzle without heating.

The spray ionization device of Comparative Example 2 was applied to the LC device and MS/MS device, a model LC-30 series manufactured by Shimadzu Corp. was used as the LC device, and the model LCMS-8060 manufactured by Shimadzu Corp. was used as the MS/MS device. The spraying gas Gf employed nitrogen gas at room temperature, the sheath gas $Gf_2$ employed nitrogen gas, and was supplied to the nozzle by heating. In Comparative Examples 1 and 2, the interface of the LC device and MS device was performed following the specifications of Shimadzu Corp. Heating of the ejected droplets was not performed in Comparative Example 1, and heating of droplets was performed by heating the sheath gas in Comparative Example 2.

In Example 1, Example 2, Comparative Example 1 and Comparative Example 2, the high-voltage power source (supply by mass spectrometer main body) was connected to the gas supply tubes 23, 123, 223, and direct current voltage was applied to the sample liquid at the ion capture port of the MS device or MS/MS device.

Measurement Example 1: Detection of Reserpine

A reserpine solution having a concentration of 1 ppb was introduced in an amount of 1 μL from the injector of the LC device, and a 70% acetonitrile aqueous solution with mobile phase: acetonitrile=3:7 was fed at 400 μL/min as eluent using the LC device. Selective ion monitoring (SIM) analysis was performed by the MS device by ejecting the fed eluent containing sample liquid by the spray ionization devices of Example 1 and Comparative Example 1, and the total area of the peak of the ion signal in the positive ion mode with mass-to-charge ratio m/z=609.3 was measured. Multiple-reaction monitoring (MRM) analysis was performed by the MS/MS device by ejecting the fed eluent containing sample liquid by the spray ionization devices of Example 2 and Comparative Example 2, and the total area of the peak of the ion signal in the positive ion mode with mass-to-charge ratio m/z=609.3>195.0 was measured, for a specific product ion produced by destroying precursor ion. Direct current voltage of +5 kV was supplied to the gas supply tubes 23, 123, 223.

The spraying gas Gf was set to a flowrate of 1.5 L/min in Example 1 and Comparative Example 1, and a flowrate of 2.5 L/min in Example 2 and Comparative Example 2. The sheath gas was heated to 180° C., and the flowrate of 20 L/min was set in Example 2 and Comparative Example 2.

Figure 8A:
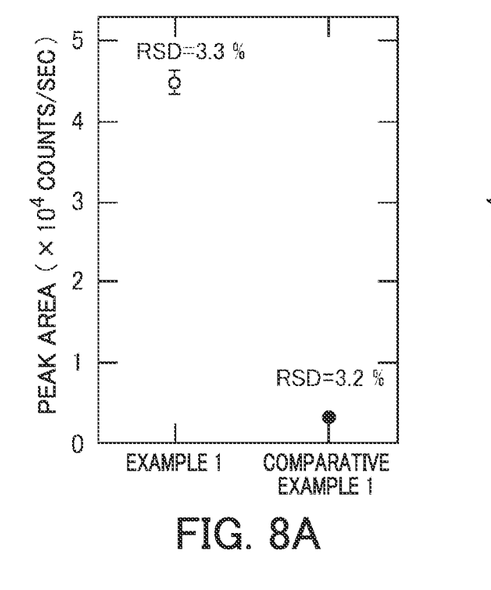
FIGS. 8A and 8B are graphs illustrating a Measurement Example of reserpine.
Figure 8B:
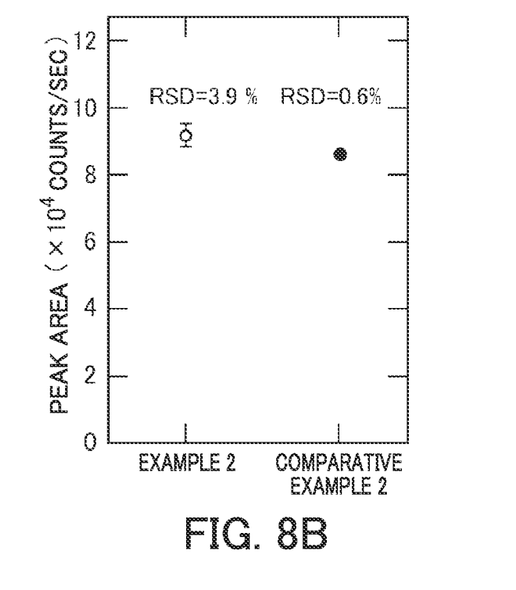

FIG. 8A and 8B are graphs illustrating a Measurement Example of reserpine, with FIG. 8A being a case of Example 1 and Comparative Example 1 not performing heating of the spraying gas, and FIG. 8B being a case of Example 2 and Comparative Example 2 performing heating of the sheath gas (180° C.). The vertical axis is the peak area (count number), and by counting the peak area obtained per one measurement and measuring three times, the average value, standard deviation and relative standard device (RSD) (%) (=average value/standard deviation×100) were calculated, and the average value is shown by circles and the standard deviation is shown by error bars in FIG. 8.

Referring to FIG. 8A, Example 1 was $4.5 \times 10^4$ counts; whereas, the Comparative Example was $0.31 \times 10^4$ counts. In the Examples, 14 times the signal intensity was obtained in the case of no heat treatment relative to the Comparative Examples, whereby it was found that Example 1 much more efficiently ionized reserpine than Comparative Example 1.

Referring to FIG. 8B, Example 2 was $9.2 \times 10^4$ counts; whereas, Comparative Example 2 was $8.6 \times 10^4$ counts. In Example 2, 1.1 times the signal intensity was obtained in the case of heat treatment relative to Comparative Example 2, whereby it was found that the Examples much more efficiently ionized reserpine than the Comparative Examples.

Measurement Example 2: Detection of Chloramphenicol

A chloramphenicol solution having a concentration of 10 ppb was introduced in an amount of 1 μL from the injector of the LC device, and a 70% acetonitrile aqueous solution with mobile phase: acetonitrile=3:7 was fed at 400 μL/min as eluent using the LC device. SIM analysis was performed by the MS device similarly to Measurement Example 1 by ejecting the fed eluent containing sample liquid by the spray ionization devices of Example 1 and Comparative Example 1, and the total area of the peak of the ion signal in the negative ion mode with mass-to-charge ratio m/z=321.00 was measured. MRM analysis was performed by the MS/MS device by ejecting the fed eluent containing sample liquid to the spray ionization devices of Example 2 and Comparative Example 2, and the total area of the peak of the ion signal was measured in the negative ion mode of mass-to-charge ratio m/z=321.00>152.10. Direct current voltage of −3 kV was supplied to the gas supply tubes 23, 123, 223.

The spraying gas Gf was set to a flowrate of 1.5 L/min in Example 1 and Comparative Example 1, and a flowrate of 1.5 L/min in Example 2 and Comparative Example 2. The sheath gas was heated to 100° C., and the flowrate of 6 L/min was set in Example 2 and Comparative Example 2.

Figure 9A:
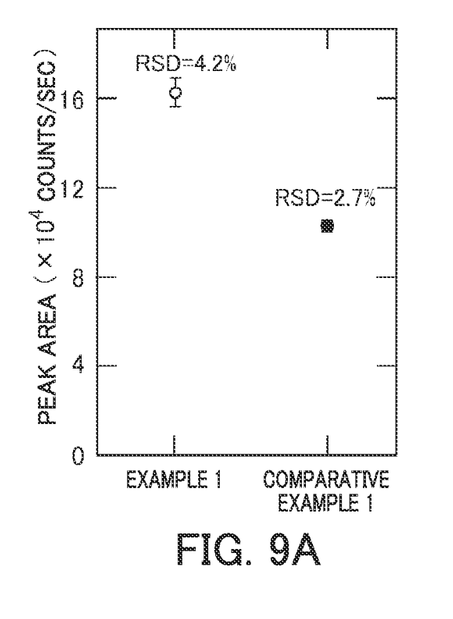
FIGS. 9A and 9B are graphs illustrating a Measurement Example of chloramphenicol.
Figure 9B:
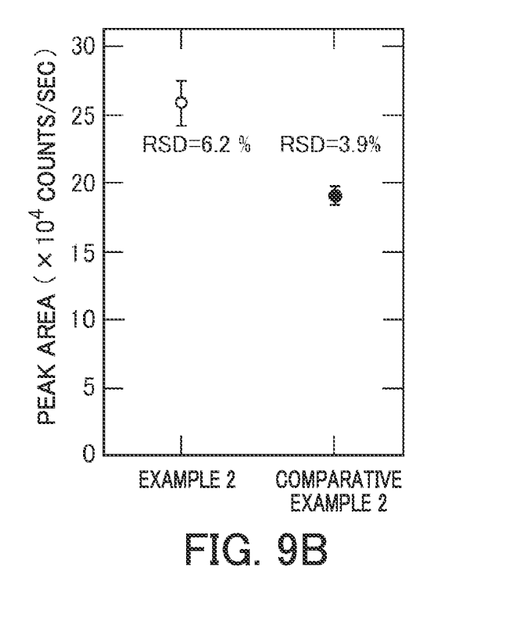

FIG. 9A and 9B are graphs illustrating a Measurement Example of chloramphenicol, with FIG. 9A being a case of Example 1 and Comparative Example 1 not performing heating of the spraying gas, and FIG. 9B being a case of Example 2 and Comparative Example 2 performing heating of the sheath gas (100° C.). The vertical axis is the peak area (count number), and shows the average value, standard deviation and RSD, similarly to Measurement Example 1.

Referring to FIG. 9A, Example 1 was $1.6 \times 10^5$ counts; whereas, Comparative Example 1 was $1.0 \times 10^5$ counts. In Example 1, 1.6 times the signal intensity was obtained relative to Comparative Example 1, whereby it was found that Example 1 much more efficiently ionized chloramphenicol than Comparative Example 1.

Referring to FIG. 9B, Example 2 was $2.6 \times 10^5$ counts; whereas, Comparative Example 2 was $1.9 \times 10^5$ counts. In Example 2, 1.4 times the signal intensity was obtained in the case of heat treatment relative to Comparative Example 2, whereby it was found that Example 2 could much more efficiently ionize chloramphenicol than Comparative Example 2.

Measurement Example 3: Detection of Testosterone

A testosterone solution having a concentration of 10 ppb was introduced in an amount of 1 μL from the injector of the LC device, and a 70% acetonitrile aqueous solution with mobile phase: acetonitrile=3:7 was fed at 400 μL/min as eluent using the LC device. SIM analysis was performed by the MS device similarly to Measurement Example 1 by ejecting the fed eluent containing sample liquid by the spray ionization devices of Example 1 and Comparative Example 1, and the total area of the peak of the ion signal in the positive ion mode with mass-to-charge ratio m/z=289.35 was measured. MRM analysis was performed by the MS/MS device by ejecting the fed eluent containing sample liquid to the spray ionization devices of Example 2 and Comparative Example 2, and the total area of the peak of the ion signal was measured in the positive ion mode of mass-to-charge ratio m/z=289.35 >97.20. Direct current voltage of +5 kV was supplied to the gas supply tubes 23, 123, 223.

The spraying gas Gf was set to a flowrate of 1.5 L/min in Example 1 and Comparative Example 1, and a flowrate of 3 L/min in Example 2 and Comparative Example 2. The sheath gas was heated to 180° C., and the flowrate of 14 L/min was set in Example 2 and Comparative Example 2.

Figure 10A:
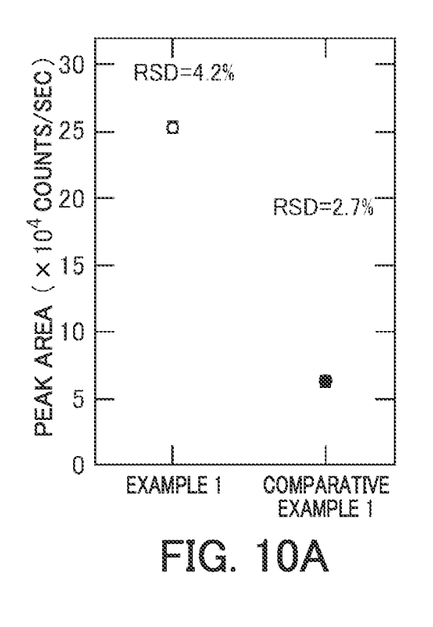
FIGS. 10A and 10B are graphs illustrating a Measurement Example of testosterone.
Figure 10B:
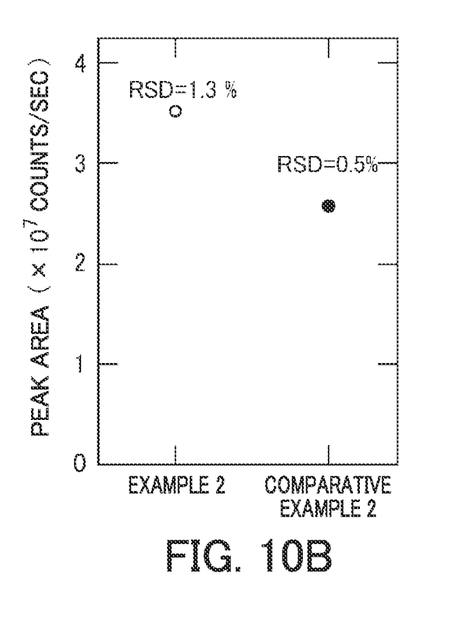

FIGS. 10A and 10B are graphs illustrating a Measurement Example of testosterone, with FIG. 10A being a case of Example 1 and Comparative Example 1 not performing heating of the spraying gas, and FIG. 10B being a case of Example 2 and Comparative Example 2 performing heating of the sheath gas (180° C.). The vertical axis is the peak area (count number), and shows the average value, standard deviation and RSD, similarly to Measurement Example 1.

Referring to FIG. 10A, Example 1 was $2.5 \times 10^5$ counts; whereas, Comparative Example 1 was $6.4 \times 10^4$ counts. In Example 1, 4.0 times the signal intensity was obtained relative to Comparative Example 1, whereby it was found that Example 1 could much more efficiently ionize testosterone than Comparative Example 1.

Referring to FIG. 10B, Example 2 was $3.5 \times 10^7$ counts; whereas, Comparative Example 2 was $2.6 \times 10^7$ counts. In Example 2, 1.4 times the signal intensity was obtained in the case of heat treatment relative to Comparative Example 2, whereby it was found that the Example 2 could much more efficiently ionize testosterone than Comparative Example 2.

Analysis Device

Figure 11:
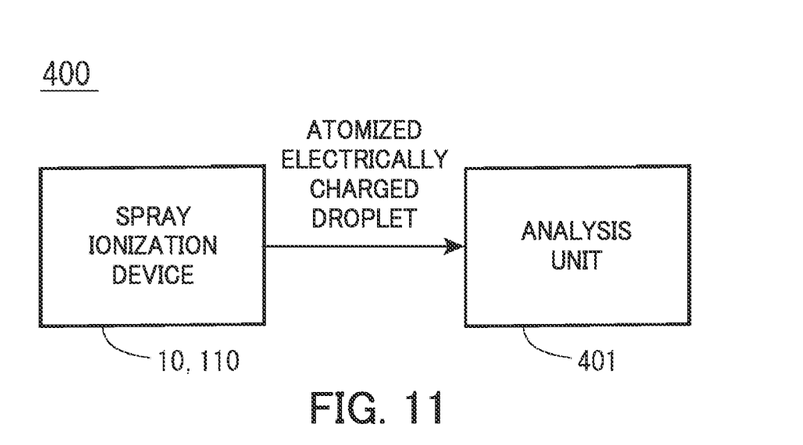
FIG. 11 is a diagram schematically illustrating a configuration of an analysis device according to an embodiment of the present invention.

FIG. 11 is a diagram schematically illustrating a configuration of an analysis device according to an embodiment of the present invention. Referring to FIG. 11, an analysis device 400 includes the spray ionization device 10 of the first embodiment or the spray ionization device 110 of the second embodiment; and an analysis unit 401 which performs mass spectrometry, etc. by introducing atomized electrically charged droplets from the spray ionization device 10, 110.

The spray ionization device 10, 110 is selected from among the spray ionization devices 10 and 110 of the aforementioned first and second embodiments. The spray ionization device 10, 110 sends to the analysis unit 401 the electrically charged droplets atomized by the sample liquid Lf being sprayed. The atomized electrically charged droplets are introduced to the analysis unit 401 in a state in which molecules, clusters, etc. of components contained in the sample liquid are electrically charged by evaporation of solvent.

The analysis unit 401, in the case of being a mass spectrometer, has an ion lens, quadrupole mass filter and detector (none illustrated). Ions of the components of the sample liquid Lf generated in the spray ionization device 10, 110 are focused by the ion lens, specific ions are separated based on mass-to-charge ratio by the quadrupole mass filter, detected for every mass number by the detector, and the signals thereof are outputted.

The spray ionization device 10, 110 efficiently generates ions of the components of the sample liquid; therefore, it is possible to use as the ion source of trace amount components. The analysis device 400 is a liquid chromatography-mass spectrometer (LC/MS) including the spray ionization device 10 as the ion source.

In the foregoing, the preferred embodiments of the present invention have been described in detail; however, the present invention is not limited to the specific embodiments, and various modifications and changes can be made within the scope of the present invention described in the claims.

The shape of the cross-section and the channel of the liquid supply tube has been described as circular, but may be triangular, square, pentagonal, hexagonal or other polygonal shapes, or other shapes such as an elliptical shape. The shape of the outer circumferential surface and the inner circumferential surface of the gas supply tube and the second gas supply tube can be selected from these shapes, depending on the shape of the liquid supply tube.

The spray ionization device of each of the aforementioned embodiments can be used as an ion source of various devices; for example, in the field of trace sample analysis, the spray ionization device can be used for mass spectrometry such as mass spectrometry of molecules in a biological sample, elemental analysis, chemical morphology analysis, and charged particle analysis.

The spray ionization devices 10 and 110 according to the aforementioned first and second embodiments, by applying to a surface coating apparatus, can form a coating film on the surface of an object by spraying electrically charged droplets of a coating liquid. In addition, the spray ionization devices 10 and 110 according to the aforementioned first and second embodiments, by applying to a granulation apparatus, can form particles of components contained in a suspension by spraying electrically charged droplets of the suspension.

In the field of food production, healthcare, and agriculture, the spray ionization devices 10 and 110 according to the aforementioned first and second embodiments can be used in space processing utilizing sterilization, deodorization, dust collection, and chemical reactions, utilizing gas-phase or spatial chemical reactions by spraying electrically charged droplets.

EXPLANATION OF REFERENCE NUMERALS 10, 110 spray ionization device
11, 111 sprayer
14 high-voltage power source
15, 35, 45, 115 nozzle
18 electrode
19, 119 heating unit
21 liquid supply tube
22 protective tube
23 gas supply tube
24 first channel
25 second channel
26 constriction portion
129 third channel
400 analysis device
Lf sample liquid
Gf spraying gas
$Gf_2$ sheath gas

The invention claimed is:

1. A spray ionization device, comprising:
a first tube including a first channel through which a liquid can flow, the first tube including a first outlet for ejecting the liquid at one end, and having an outer circumferential surface with an outer diameter constant from an upstream side to the one end;

a second tube surrounding the first tube and having an outer circumferential surface with an outer diameter constant from an upstream side to the one end; and a second tube surrounding the first tube; and a third tube surrounding the second tube with a gap, and having a second channel through which gas can flow, the third tube having a second outlet at the one end, in which the second channel is defined by the outer circumferential surface of the second tube and an inner circumferential surface of the third tube, wherein the second channel has a constriction portion in which the channel area is minimized, the constriction portion being located more upstream than the first outlet, and the second channel being configured so that a channel area progressively decreases from an opposite end side until the constriction portion, wherein the second outlet of the third tube is disposed at the same position in an axial direction as the first outlet or more downstream than the first outlet, wherein an opening diameter of the second outlet is formed to be smaller than the outer diameter of the outer circumferential surface of the second tube at the one end, and wherein the third tube has at least a tip including a second outlet consisting of an electrically conductive material as an electrode, and is capable of applying an electric field to droplets ejected from the first outlet by a power source connected to the electrode to eject electrically charged droplets from the second outlet.

2. The spray ionization device according to claim 1, wherein an inner circumferential surface of the third tube progressively decreases in diameter towards the second outlet, and the constriction portion is formed by the inner circumferential surface of the third tube and a tip of the second tube.

3. The spray ionization device according to claim 1, wherein the tip of the second tube is formed more to an opposite end side than the first outlet.

4. The spray ionization device according to claim 1, wherein a distance in an axial direction between the second outlet and the first outlet is set within a range of 0 mm to 1 mm.

5. The spray ionization device according to claim 1, wherein between the outer circumferential surface of the first tube and the inner circumferential surface of the second tube is blocked by a filler material at a tip of the second tube.

6. The spray ionization device according to claim 1, wherein the inner circumferential surface of the second tube comes into contact along a circumferential direction and a longitudinal direction with the outer circumferential surface of the first tube.

7. The spray ionization device according to claim 1, further comprising a fourth tube surrounding the third tube with a gap, and having a third channel with a third outlet at the one end, and allowing a second gas to flow therethrough, wherein the third channel is defined by an outer circumferential surface of the third tube and an inner circumferential surface of the fourth tube, wherein the inner circumferential surface of the fourth tube extends with a predetermined inside diameter or progressively expands in diameter towards a tip, and wherein the third outlet is disposed more to a downstream side than the second outlet.

8. An analysis device comprising:

the spray ionization device according to claim 1; and an analysis unit which performs analysis by introducing an electrically charged component desolventized of the electrically charged droplet ejected from the spray ionization device.

9. A surface coating device comprising the spray ionization device according to claim 1.

* * * * *